United States Patent [19]
Edwards

[11] Patent Number: 5,398,226
[45] Date of Patent: Mar. 14, 1995

[54] IMAGE TRACKING OF OPTICAL MEDIA USING TWO WAVELENGTH OPTICAL HEAD

[75] Inventor: Jathan D. Edwards, Oakdale, Minn.

[73] Assignee: Minnesota Mining and Manufacturing Company, St. Paul, Minn.

[21] Appl. No.: 904,174

[22] Filed: Jun. 25, 1992

[51] Int. Cl.[6] .............................................. G11B 7/00
[52] U.S. Cl. ............................ 369/44.38; 369/44.11; 369/112
[58] Field of Search ............... 369/44.37, 44.38, 110, 369/111, 112, 118, 44.23, 44.24, 44.14, 44.11, 44.26

[56] References Cited

U.S. PATENT DOCUMENTS

| | | | |
|---|---|---|---|
| 4,507,763 | 3/1985 | Kato | 369/44.38 |
| 4,530,080 | 7/1985 | Aoi et al. | 369/44.38 |
| 4,700,336 | 10/1987 | Yoshida et al. | 369/44.38 |
| 4,730,293 | 3/1988 | Pierce et al. | 369/44.38 |
| 4,841,514 | 6/1989 | Tsuboi et al. | 369/44.37 |
| 4,893,298 | 1/1990 | Pasman et al. | 369/44.37 |
| 5,113,387 | 5/1992 | Goldsmith et al. | 369/44.38 |
| 5,195,081 | 3/1993 | Usui | 369/44.23 |
| 5,247,504 | 9/1993 | Akatsuka | 369/44.38 |
| 5,278,812 | 1/1994 | Adar et al. | 369/44.37 |

FOREIGN PATENT DOCUMENTS

0086124  4/1988  Japan ........................ 369/44.38

Primary Examiner—Aristotelis M. Psitos
Assistant Examiner—Thang V. Tran
Attorney, Agent, or Firm—Gary L. Griswold; Walter N. Kirn; Eric D. Levinson

[57] ABSTRACT

An imaging tracking system and method for tracking optical media using a two wavelength optical head.

7 Claims, 6 Drawing Sheets

IMAGE TRACKING OF OPTICAL MEDIA USING TWO WAVELENGTH OPTICAL HEAD

FIELD OF THE INVENTION

This invention relates to an imaging method and system for use in optically tracking recording media. A tracking laser and a separate read/write laser are used.

BACKGROUND OF THE INVENTION

Within the field of optical media manufacture, various media formats exist. In a broad sense, optical media formats may be either preformatted or unformatted. Most conventional optical media formats include precise physical grooves in the media which are followed by the drive during reading and/or writing operation(s). The groove dimensions and spacings are precisely controlled during a mastering operation during the manufacture of the disks. In the case of read only memory formats, such as CD ROM or optical video disks, the data tracks consist of a sequence of physical groove segments, i.e. pits, which are deciphered by the disk drive as digital, audio or video information. In the case of write-once, i.e. WORM, or erasable media formats, the tracking groove is more or less continuous but has discontinuities that provide track identification information.

Conventional optical data systems typically employ a tracking servo mechanism which enables a focused spot of laser light to follow the data tracks. These tracking methods generally rely on the interaction between the optical media and the focused spot of light emitted from a laser diode. A focusing servo maintains objective-to-media distance at exactly the objective's focal length to provide diffraction limited optical spots on the media surface. Typically, the same laser beam, or beams of substantially identical wavelength, performs the tasks of servo feedback for tracking. Accordingly, the write path efficiency is reduced.

SUMMARY OF THE INVENTION

The invention comprises an imaging method for use in optically tracking recording media. The method includes providing a read/write laser and an image tracking laser. The read/write laser is maintained in focus on a media surface and the image tracking laser is configured so that it has a beam which has an apparent focus at a point other than at the media surface.

The invention also comprises an imaging system for use in optically tracking recording media. The system includes a read/write laser configured such that the laser is focused on the surface of a recording media. An image tracking laser is operable with the read/write laser, and the image tracking laser is configured with an apparent focus at a point other than at the media surface.

The invention also comprises a track location verification method for use with optically recorded media. The method includes providing an image tracking laser having a beam with an apparent focus at a point other than at the surface of an optical recording media to provide a reflected image of a plurality of tracks. A reflected image is received and processed to provide track location verification data.

The invention also comprises a direct read after write imaging system for use with optically tracked recording media. A read/write laser is configured such that the laser is focused on the surface of a recording media. An image tracking laser is operable with the read/write laser. The image tracking laser is configured with an apparent focus at a point other than at the media surface to provide a reflected image of the media surface sufficiently large enough to permit track data imaging for direct read after write operation.

DETAILED DESCRIPTION OF THE INVENTION

Figure 1:
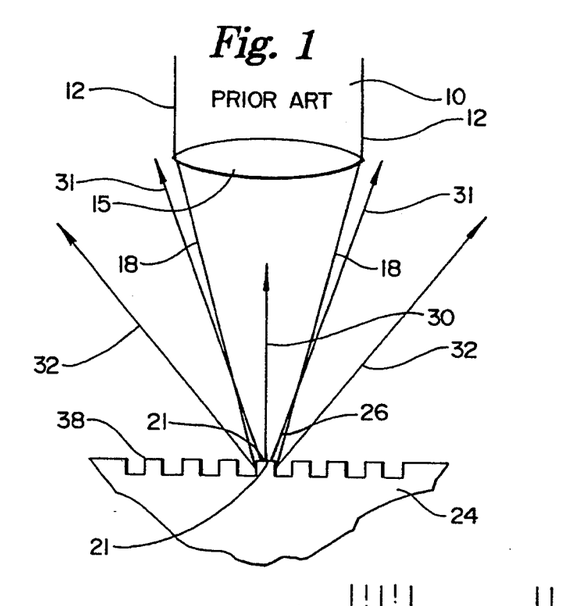
FIG. 1 is a simplified diagram illustrating diffraction of a focused optical beam from a media surface having a plurality of physical tracking features or grooves.

Referring to FIG. 1, a conventional optical system is disclosed. A light beam 10 is shown with light path margin 12 entering objective lens 15. Light beam 10 converges with focusing path margins 18 to a focal point 21 located at a surface of media 24,. Thus, objective lens 15 focuses light beam 10 to a spot 26 on media 24 surface. Reflected light for detection within an optical head (not shown in FIG. 1) comprises a plurality of light rays diffracted from media surface 24, such as the zero (0th order) ray 30, the first (1st order) ray 31, and the second (2nd order) ray 32. Media 24 has preformatted grooves 38 or data features which diffract the reflected light beams in such a way that the 0th and ±1st diffracted beams are normally collected by objective lens 15. These diffracted orders interfere destructively to create dark and light patterns in a detectable optical pattern which varies as focal spot 26 passes over preformatted groove(s) 38.

Figure 2:
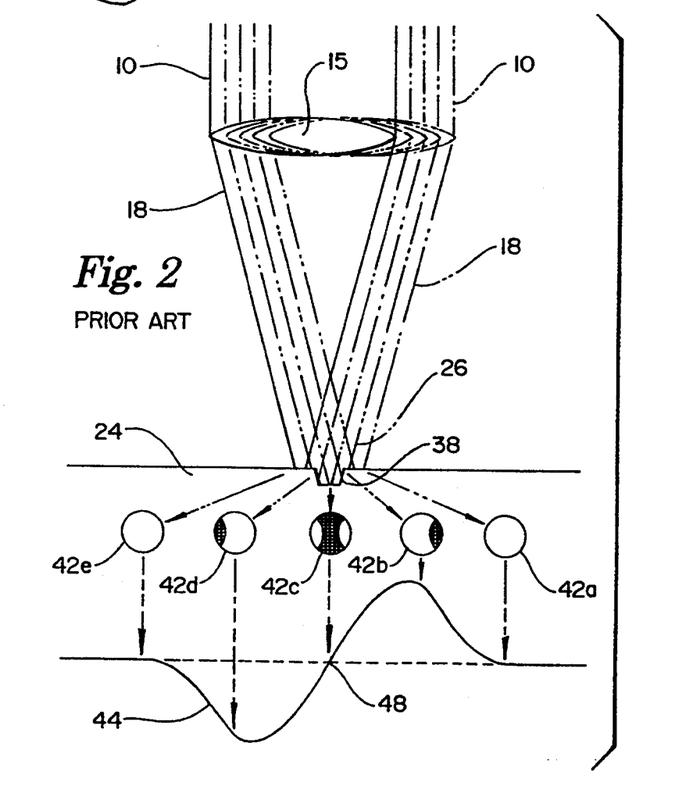
FIG. 2 is a simplified diagram of a variety of optical beam transmissions through a convex lens configuration onto a data depressed media surface, and the resulting visual and waveform images.

FIG. 2 shows a plurality of objective lens locations and light beam locations. FIG. 2 also shows various focusing path margins 18 which produce various optical patterns. Optical heads may sense these optical patterns, as represented by image views 42a, 42b, 42c, 42d, and 42e. Subsequent electronic conversion of the optical patterns, as shown in the representative image views, then yields a track error signal. Although various forms of a track error signal may be provided, FIG. 2 illustrates a waveform track error signal 44 which is representative. A split photodetector is a common means for converting the optical head signal into an optical pattern to provide the input data to generate the track error signal 44. Track error signal 44 is designed to be proportional to the lens-to-track separation, as shown by the correlation of the neutral wave point 48 with the image view 42c corresponding to focusing spot 26 positioned in precise alignment with the groove 38.

Figure 3:
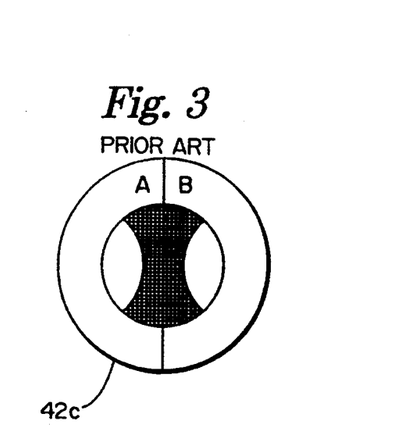
FIG. 3 is an enlarged simplified diagram of a split visual image corresponding generally to that disclosed in FIG. 2.

FIG. 3 is an enlarged simplified diagram of image view 42c. FIG. 3 highlights the function of a split photodetector in which the optical image results from a summing of portion A with portion B. For example, when activated, the tracking servo associated with a system using a split photodetector drives a lens actuator in a cross track direction to maintain the track error signal at a constant level. Thus, focal spot 26 is kept on track (groove 38) using what is called the "push-pull" tracking method. Other common alternatives to the push-pull tracking method include the "wobble" technique and the "outrigger" technique. These techniques are disclosed in FIG. 4 and FIG. 5 respectively. Each of these methods comprise tracking on the recorded features of the media and, thus, could be used for an unformatted media as well.

Figure 4:
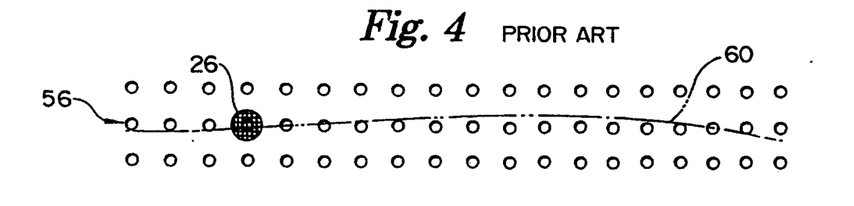
FIG. 4 is a simplified diagram of the wobble path of single spot scan tracking detector means in the prior art.

FIG. 4 illustrates the wobble technique, which involves continually wobbling an objective lens a very small amount on either side of a data track, such as data track 56. As illustrated, focal spot 26 wobbles along scan path 60 on either side of track 56. With such a slight wobble, focal spot 26 never goes completely off data track 56, but the amplitude of the retrieved data signal modulates at the same frequency as the wobble. The tracking servo associated with such a system then drives the lens actuator to maintain the same amplitude drop for excursions in either direction from the track center.

Figure 5:
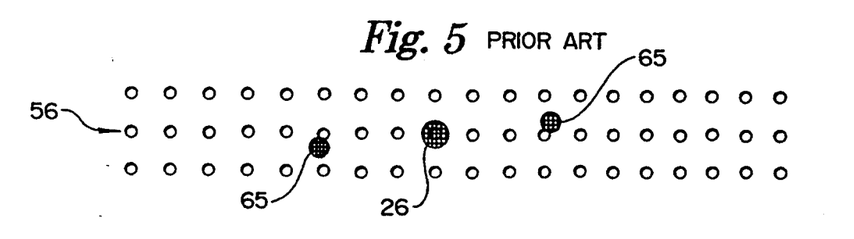
FIG. 5 is a simplified diagram of a plurality of spot array scan detecting means in the prior art.

FIG. 5 illustrates the outrigger technique, which uses a diffractive element within an optical head to produce two side spots of lesser intensity than the main spot. A primary focal spot 26, also referred to as a primary scan spot, interacts with outrigger scan spots 65. This array of three spots is aligned approximately tangent to data track 56 with the outrigger scan spots straddling either side of data track 56. Utilizing this method, the associated servo drives the lens actuator to balance the data signal amplitude from the two outrigger scan spots. Both the wobble and outrigger methods are actually applications of the same principal.

All of the tracking methods described above rely on the interaction between an optical media and a focused spot of light from a laser diode. The focusing servo maintains the objective-to-media distance at exactly the objective lens focal length to provide diffraction limited optical spots of about 1 micron in size on the media. This results in a "field of view" of any one spot of approximately one track width. In contrast to these known methods and systems, this invention utilizes a two laser optical head in which one laser is designated for read/write and the other laser, which has a field of view of several tracks, is designated as the tracking laser. This tracking laser may be used for an image tracking technique on either formatted or unformatted media.

Figure 6:
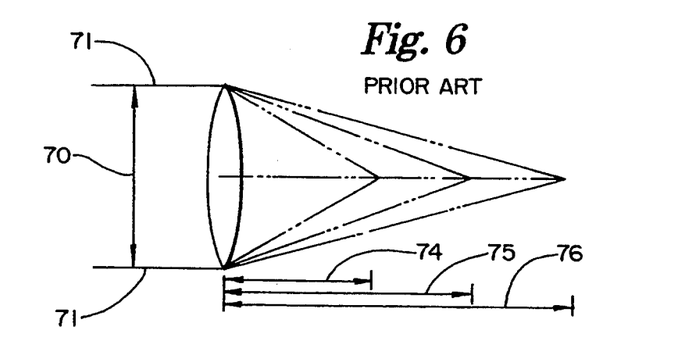
FIG. 6 is a simplified depiction of spectral refraction of a convex lens.
Figure 7:
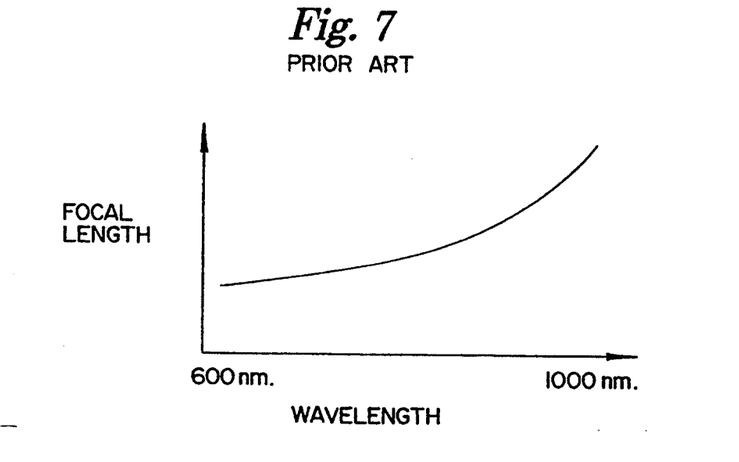
FIG. 7 is a simplified graph depicting the increase of focal length of a lens as a function of the wavelength of the beam passing therethrough.

The separation of the read/write and the image tracking functions within the proposed optical head relies on the property of simple lenses in which the focal length of a beam passing through the lenses varies as a function of wavelength. This is demonstrated in simplified form in FIG. 6 and FIG. 7. In FIG. 6, the visible light area 70, delineated by light path margins 71, enters convex lens 73. The resultant focal lengths are shown in representative fashion as a function of the wavelength of the band of light passing through the lens. For example, focal length 74 corresponds to a blue light wavelength, while focal length 75 corresponds to a red light wavelength and focal length 76 corresponds to an infrared light wavelength. This is also demonstrated in graphic form in FIG. 7. FIG. 6 and FIG. 7 illustrate that the simultaneous focusing of two wavelengths of laser light through the same objective lens will provide laser light of two focal lengths. The shorter wavelength will have a shorter focal length, and the longer wavelength will have a longer focal length. This principal is incorporated in the representative first embodiment of this invention in FIG. 8.

Figure 8:
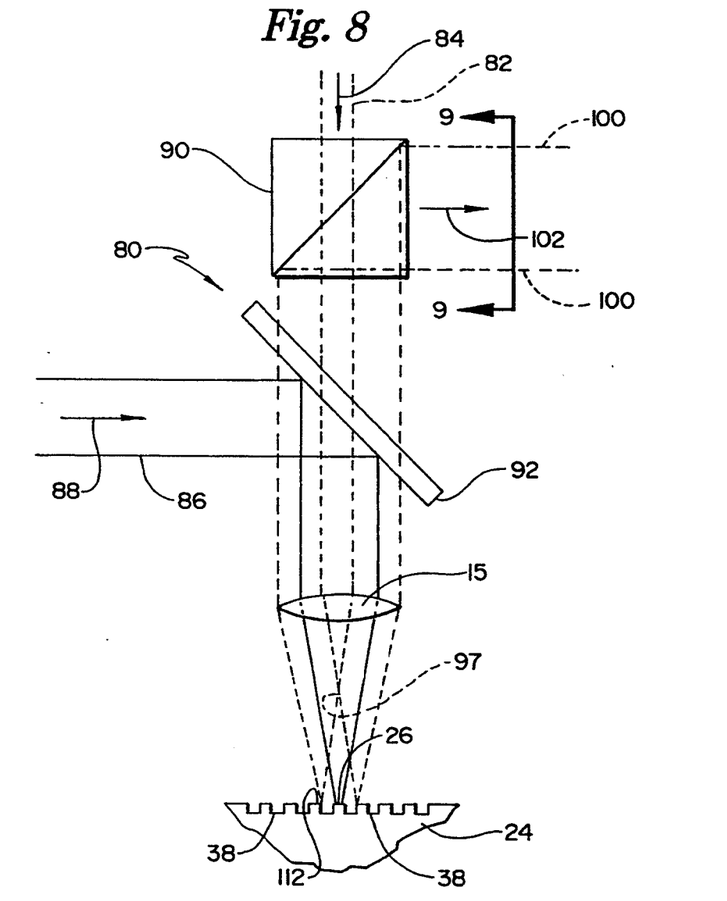
FIG. 8 is a simplified diagram of a first embodiment of the dual wavelength system of the invention.

FIG. 8 discloses an imaging system 80 having a dual wavelength configuration. In particular, system 80 comprises a relatively shorter wavelength light path 82 transmitted in the direction shown by arrow 84, and a relatively longer wavelength light path 86 transmitted in the direction shown by arrow 88.

Figure 9:
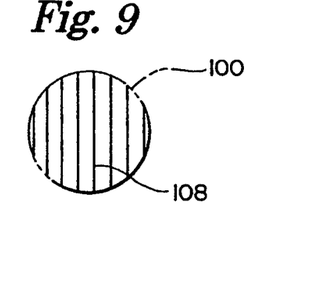
FIG. 9 is a view taken along line 9—9 in FIG. 8 showing the resultant visual image.

Light path 82 is transmitted through beam splitter 90, dichroic filter 92, and objective lens 15 to achieve a focal point 97 at a point other than at the surface of media 24. Light path 82, interchangeably referred to as image tracking laser 82, is configured with an apparent focus at a point other than at the media surface in order to illuminate several tracks 38 and to reflect the image of those tracks back into an optical head. This is demonstrated in FIG. 8 by tracking image 100 depicted in a directional manner enroute an optical analysis portion of system 80 by arrow 102. The pattern of tracking image 100 is shown in FIG. 9 by a representative tracking image pattern comprised of a plurality of data marks 108 corresponding to grooves or tracks 38 or other data features, imaged by the light path. In the event of other data features, such as data strings, then data marks 108 would likely display as segmented rather than continuous data marks 108. Tracking image 100 is different from images generated by other tracking systems in that it does not rely on diffraction from pre-grooves, but rather only from optical contrast. Therefore, any optically detectable mark, such as is recorded in WORM media or M-O erasable media, may be photodetected and used to provide tracking guidance. In addition to transmission of the shorter wavelength light path and the analysis of the resulting tracking image, there is transmission of the longer wavelength light path 86 to dichroic filter 92, and objective lens 15. This transmission creates focal spot 26 preferably located at the surface of media 24 which comprises data. Although the wavelength of light paths 82, 86 may vary considerably, a representative example of optimum wavelengths includes shorter wavelength light path 82 having a 680 nanometer wavelength and longer wavelength light path 86 having a 830 nanometer wavelength. Conventional optical data systems often use high power AL-GaAs laser diodes at 830 nanometer wavelength for servo feedback and read/write. Recently, however, AlGaInP laser diodes are being developed with about a 2–5 milliwatt output power at a 680 nanometer wavelength. In at least one embodiment of this invention, the proposed optical head design utilizes 830 nanometer and 680 nanometer beams in combination. The objective-to-media spacing in such a system is maintained to keep the 830 nanometer beam in focus on a data-relevant surface 112 of media 24 while the 680 nanometer beam has an apparent focus configured to provide a field of view which comprises a plurality of grooves/tracks 38.

Figure 10:
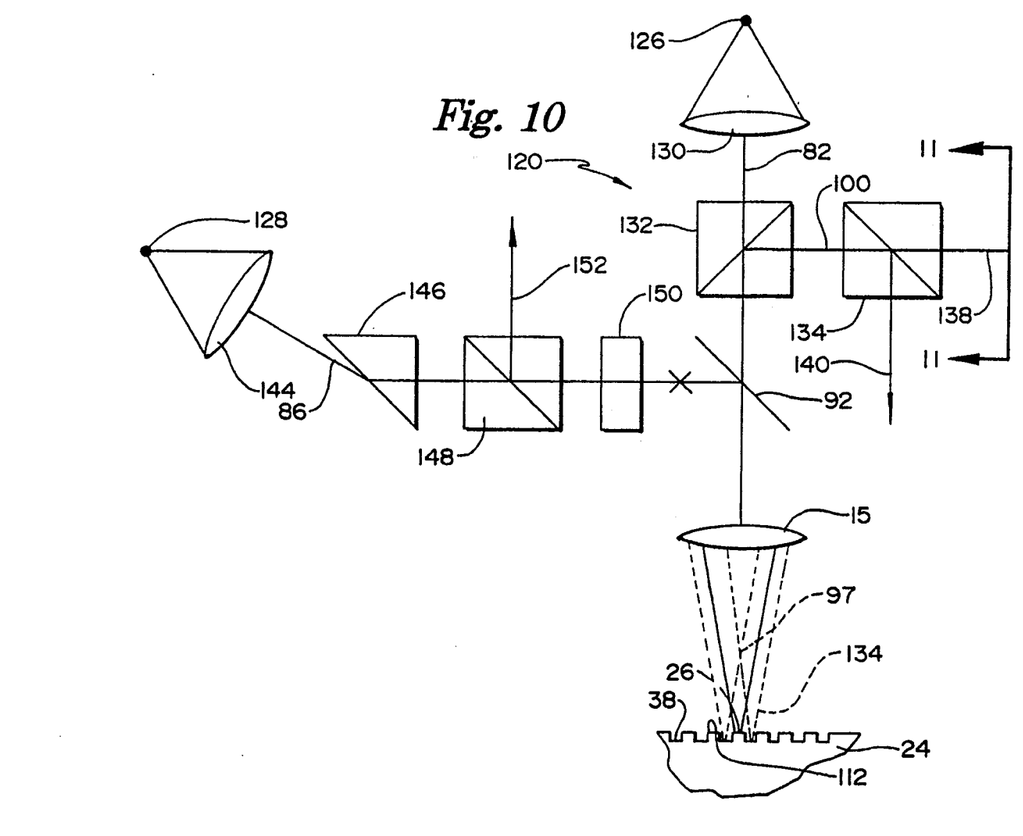
FIG. 10 is a simplified diagram of a second embodiment of the dual wavelength system of the invention.
Figure 11:
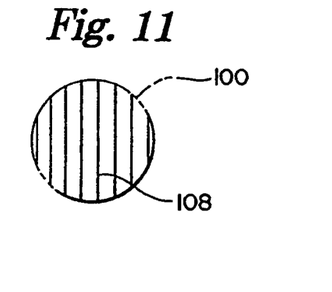
FIG. 11 is a view taken along line 11—11 in FIG. 10 and FIG. 12 showing the resultant visual images.

FIG. 10 illustrates another embodiment of a two wavelength optical head system, designated as imaging system 120. Imaging system 120 is preferably utilized with a WORM media and comprises 680 nanometer wavelength laser diode 126 and 830 nanometer wavelength laser diode 128. The shorter wavelength subsystem comprises collimating lens 130 and beam splitters 132, 134. Shorter wavelength light path 82 emits from collimating lens 130 and passes through beam splitter 132 and dichroic filter 92 enroute to objective lens 15. Focal point 97 is not located at the surface 112 of media 24. This results in light margin 133 which images a plurality of grooves or tracks 38. This in turn produces tracking image 100, which is reflected back through beam splitters 132, 134 for processing and analysis along split tracking detector path 138 and focus detector path 140. FIG. 11 illustrates a representative image pattern of tracking image 100 comprising data marks 108 corresponding to the optical detection of groove(s) 38 or other data features. In the event of other data features, such as data strings, then data marks 108 would likely display as segmented rather than continuous data marks 108.

The longer wavelength subsystem of FIG. 10 comprises laser diode 128 which emits 830 nanometer wavelength light through collimating lens 144. The longer wavelength light 86 passes through beam shaping prism 146, polarizing beam splitter 148, and ¼ wave retarder 150 to dichroic filter 92. Light beam 86 is then reflected through objective lens 15 resulting in focal spot 26 being located at a data-relevant surface 112 of media 24. Data reflected from media 24 is represented by data path 152 enroute a data signal detector, which is not shown.

Figure 12:
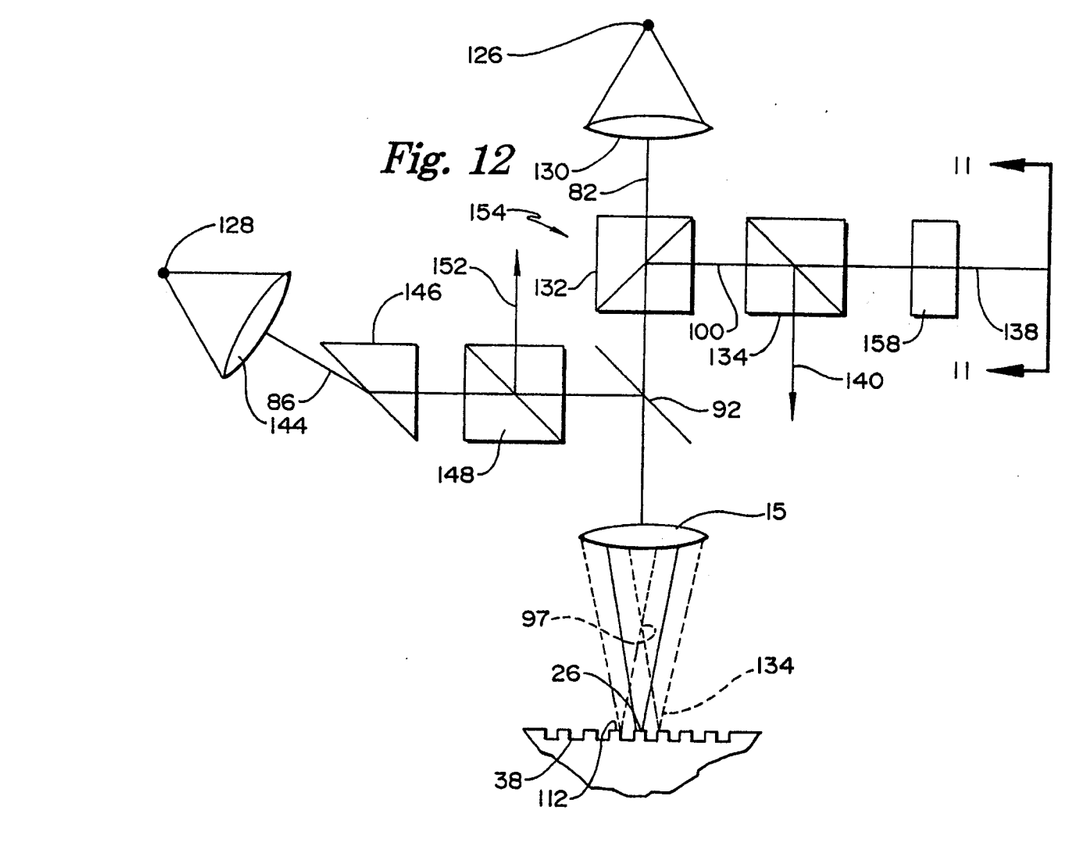
FIG. 12 is a simplified diagram of a third embodiment of the dual wavelength system of the invention.

FIG. 12 illustrates yet another embodiment of an imaging system, here denoted as system 154, with such system substantially similar to system 120 but designed particularly for magneto-optical media. Therefore, with the exception of additional polarizer 158 and lack of ¼ wave retarder 150, the system functions substantially identically to system 120. It is understood that the details of subsystem components do not limit this invention, which is directed more broadly to a dual wavelength optical head image tracking system.

Figure 13:
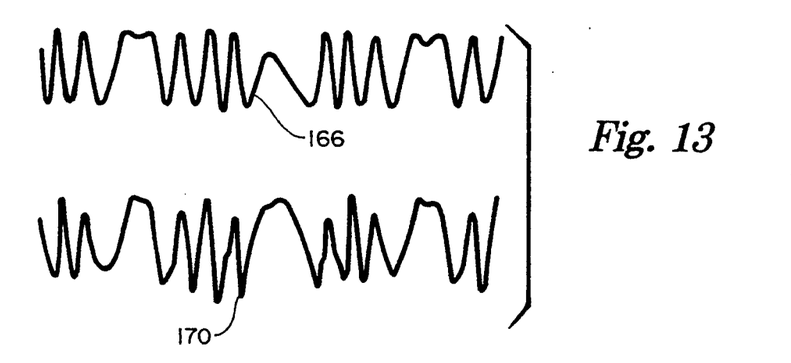
FIG. 13 is a servo image comparing a diffraction track error signal and an image track error signal as an objective lens is slowly moved across five media tracks.
Figure 14:
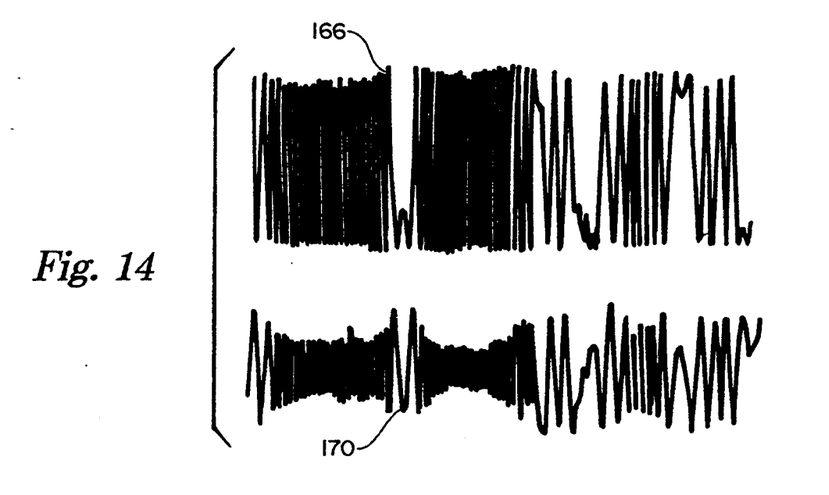
FIG. 14 is a servo image of open loop track error signals for a spinning disk media.
Figure 15:
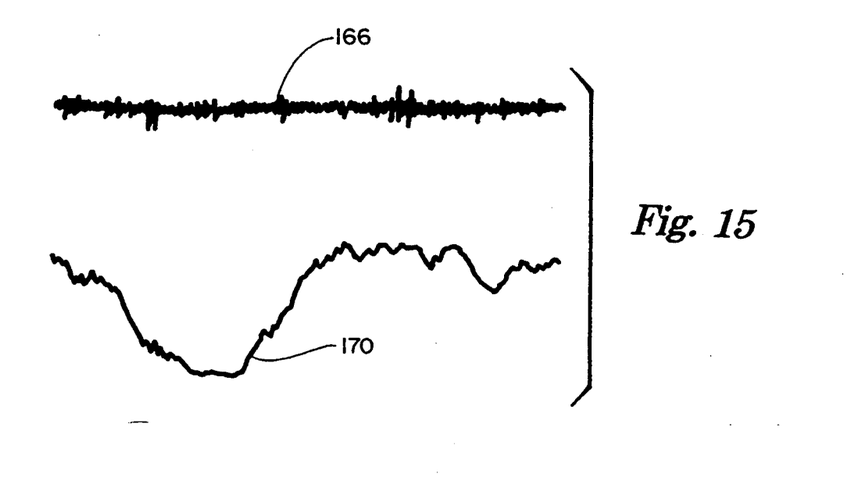
FIG. 15 is a servo image depicting a diffraction track error signal and an image track error signal, with the tracking servo loop closed and using the diffraction track error signal as feedback.

During the conduct of feasibility experiments utilizing this invention, an optical disk tester with a 0.60 numerical aperture objective was modified to generate a tracking image using a 1 milliwatt 633 nanometer HeNe beam. Using this wavelength, the tracking image from a magneto-optical disk sample replicated with a 1.6 micron track-pitch showed 12–15 tracks. Using this configuration, a comparison was made between the conventional diffraction track error signal (DTES) and the proposed image track error signal (ITES). FIG. 13 illustrates the comparative track error signals, DTES signal 166 and ITES signal 170, as the objective lens is dithered slowly back and forth across about five tracks on a media. FIG. 14 illustrates the open loop track error signals for a spinning disk where the limited frequency response of the split photodetector for ITES signal 170 is evident in the amplitude modulation of the signal. FIG. 15 compares DTES signal 166 and ITES signal 170 with the tracking servo loop closed and using DTES signal 166 as feedback. Although the DTES signal indicated a fight lock on the media track of interest, approximately ½ track of wobble was evident in the tracking image. This was probably due to the fact that the 830 nanometer spot was tracking one of the tracks not within the 633 nanometer spot's field of view. Regardless of the lower power, 1 vs. 2–5 milliwatts, and the larger illumination area due to the shorter wavelength, 633 nanometer vs. 680 nanometer, this tracking arrangement with an HeNe laser indicated a reasonable feasibility for the image tracking method with the 680 nanometer laser.

The feasibility experiment discussed above in no way limits the application of this invention. For example, media 24 may comprise flexible or rigid optically tracked media, such as tape media, optical drum media, disk media, magnetic diskettes, optically servoed rigid drive media, or other media. The wavelengths utilized may comprise a variety of wavelengths, although the utility of this invention is best realized for use of light having substantially different wavelengths. Recent developments in the field of laser diodes producing shorter wavelength light are particularly relevant in view of this invention.

The invention may also be applicable to a track location verification method for use with optically recorded media. Such a method comprises the steps of providing an image tracking laser having a beam with an apparent focus at a point other than at the surface of an optical recording media to provide a reflected image of a plurality of tracks, and then receiving and processing the reflected image to provide track location verification data. Use of the system may provide substantial benefits to a quality assurance application in a specialized media.

Additionally, as noted above, the invention is also applicable to a direct read-after-write imaging system for use with optically tracked recording media. Additional uses for this invention include functioning as a parallel readout process or for a plurality of tracks side-by-side, and as a system for reading a plurality of locations on a single track. This latter application may find particular utility in statistical analysis of tracks for high reliability drive systems. One advantage of such an invention to that application is that the multiple sampling would not slow down the drive operation.

In all of the above applications, the image tracking method proposes use of at least a two wavelength optical head to enable feature tracking on optical media. The feature tracking is performed on either preformatted or unformatted optical media. A principal advantage of the configurations of the systems described in this invention is the separation of servo and data functions within the optical head of each system, thereby reducing cross-talk and improving write efficiency by taking advantage of newly developed shorter wavelength laser diode technology.

I claim:

1. A method for optically tracking recording media, comprising:
   providing a read/write laser having a first wavelength;
   providing an image tracking laser having a second wavelength different from the first wavelength;
   providing an objective lens having a first focal length for the first wavelength light and a second focal length for the second wavelength light, the first and second focal lengths being substantially different;
   directing light from the read/write laser through the objective lens so that the light is focused on a recording medium surface; and
   directing light from the image tracking laser through the objective lens toward the recording medium surface, wherein the light from the image tracking laser has an apparent focus at a point other than at the medium surface, whereby the image tracking laser provides optical tracking information.

2. The method of claim 1, wherein the apparent focal point of the image tracking laser is located between the lens and the medium surface.

3. The method of claim 2, wherein the first wavelength exceeds the second wavelength by at least about 150 nm.

4. The method of claim 1, further comprising collimating the light from the lasers, and wherein the steps of directing light from the lasers through the objective lens further comprises directing the collimated light from the lasers through the lens.

5. A system for optically tracking recording media, comprising:
   a read/write laser having a first wavelength;
   an image tracking laser having a second wavelength; and
   an objective lens having a first focal length for the first wavelength and a second focal length for the second wavelength, the first and second focal lengths being substantially different;
   wherein the objective lens is positioned with respect to a recording medium surface so that light from the read/write laser is focused by the lens at the recording medium surface, and light from the image tracking laser passes through the lens and has an apparent focal point between the lens and the medium surface, whereby the image tracking laser provides optical tracking information.

6. The system of claim 5, wherein the first wavelength exceeds the second wavelength by at least about 150 nm.

7. The system of claim 5, further comprising means for collimating the light from the lasers so that the light is collimated when it reaches the lens.

* * * * *